United States Patent Office 3,320,007
Patented May 16, 1967

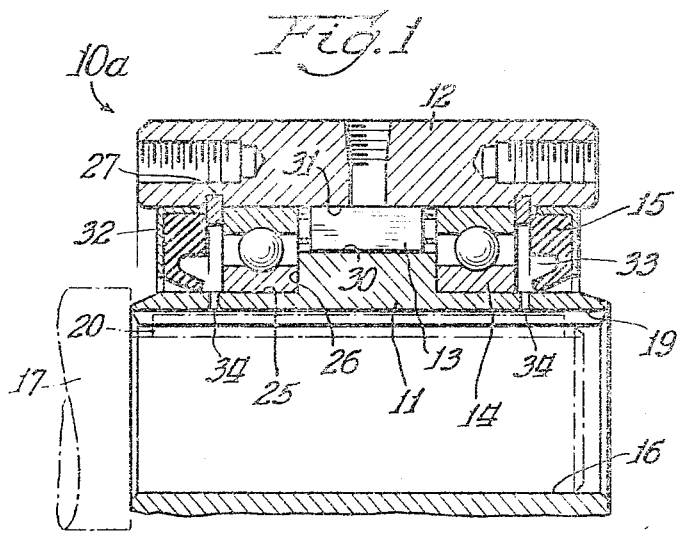
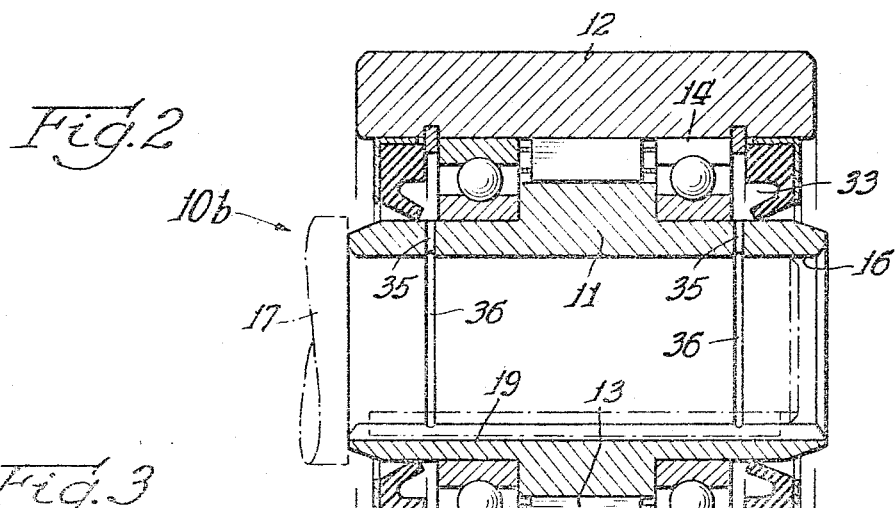
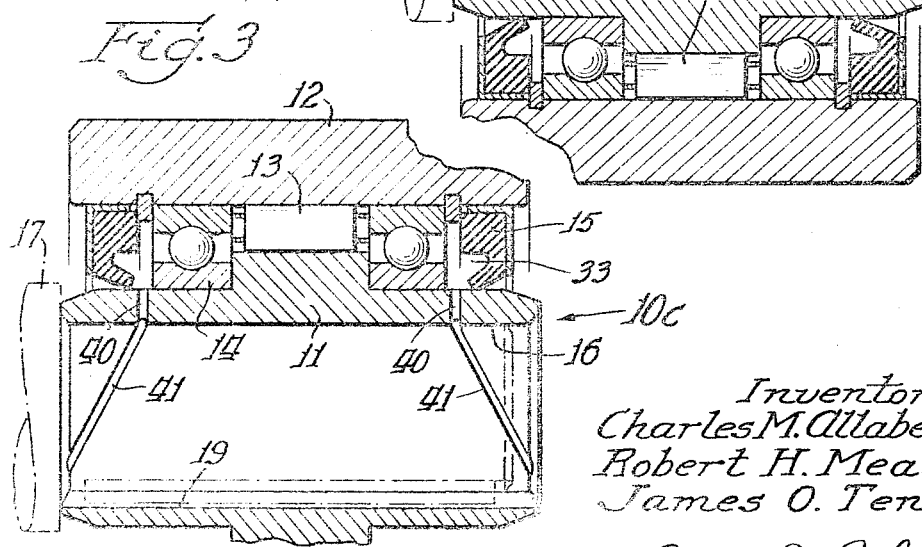
Inventors:
Charles M. Allaben, Jr.
Robert H. Mead and
James O. Tennies
By: Evan D. Roberts  Atty.

---

3,320,007
VENTED MECHANICAL DEVICE
James O. Tennies, Robert H. Mead, and Charles M. Allaben, Jr., Ithaca, N.Y., assignors to Morse Chain Company, Ithaca, N.Y., a corporation of New York
Filed Nov. 1, 1963, Ser. No. 320,906
3 Claims. (Cl. 308—36.1)

This invention relates to sealed mechanical devices and for particular example, to a rotational device having a vented lubrication chamber.

In translational and rotational devices generally and particularly in devices such as sprag and/or cam clutches where the outer element of the device is rotatably mounted on bearings on an inner element and the bearings are sealed in a lubricant enclosure, the rotation of the outer element with respect to the inner element creates friction that results in the heating of the lubricant and the adjacent air space within the sealed lubricant enclosure causing the enclosed lubricant and air to expand. The expansion of the lubricant and the surrounding air enclosed by the seal tends to force the lubricant past the seal and in some instances where the seal is tight the seal may be damaged by the increased pressure. In either event, the lubricant may be caused to bypass the seal both during operation of the device and when the device is stopped.

There have been numerous attempts to relieve the pressure in mechanical devices having sealed bearings. The structures of these attempts utilize numerous parts and are therefore usually unduly complicated and expensive. Moreover, the prior complicated types of vents are susceptible to malfunction inasmuch as overheated lubricants produce conditions and by-products that tend to interfere with the intricate operation of these more complicated venting devices. Also, such devices are subject to wear and fatigue which eventually restrict the operation thereof. Further, such devices are subject to centrifugal action that is a detriment and sometimes impossible obstacle for complicated venting apparatus to withstand during all stages of wear.

It is therefore highly desirable to provide a rotational device having a first element thereof mounted for relative rotation on a second element thereof on bearings enclosed in a sealed lubrication chamber wherein a relatively simple and economical vent structure is provided for the bearing and sprag lubrication chamber that will prevent loss of lubrication and damage to the lubricant seals, that is substantially wear free, and will be adequately effective both during operation and inoperation of the device and under all conditions of wear under the influence of centrifugal action within the device.

It is a general object of this invention to provide a rotational device having an improved lubricant vent structure which is relatively simple and economical to manufacture, use and maintain.

A more particular object of this invention is to provide a rotational device having an improved lubricant vent structure which will vent the bearing and sprag lubricant enclosure chamber thereof both during operation and inoperation of the device in a manner so as to substantially avoid loss of lubricant due to centrifugal action, expansion of the oil and by gravity.

With these and other objects in view, this present invention contemplates a rotational device adapted to be mounted on a shaft wherein a first member is mounted on a shaft, a second member is rotatably mounted on the first member on bearings contained in a lubrication chamber enclosed by seals extending from the first to the second member and the first member is provided with a vent passage extending generally radially inward and generally axially outward for venting the bearing enclosure to the atmosphere through the first member.

A cam clutch, generally represented by the numeral 10, is illustrated in FIGS. 1–3 for purposes of describing three general embodiments of the invention which are in turn generally represented by the numerals 10a, 10b and 10c in FIGS. 1, 2 and 3 respectively. The clutch 10 (FIGS. 1–3) includes, among other things, an inner race member 11, an outer race member 12, sprag 13, bearings 14, and seals 15.

The inner race 11 is provided with a shaft passage 16 adapted to receive a drive shaft 17 and a keyway 19 adapted to receive a key 20 supported in the keyway 19 and in the shaft 17 for locking the inner race 11 to the shaft. The bearings 14 are supported on an outer surface 25 of the inner race 11 against shoulders 26 extending radially outward. The outer race 12 is mounted on the bearings 14 and is thereby rotatably mounted on the inner race 11 and is held against longitudinal motion by rings 27 positioned in grooves in the outer race 12. The sprag 13 is positioned between a circumferential surface 30 of the inner race 11 and an internal surface 31 of the outer race 12 that is substantially concentric with the surface 30 of the inner race 11.

The sprag 13 can have any one of many configurations normally utilized in cam clutches and for purposes of illustrating this invention the sprags are of the type which are cammed into engagement with the surfaces 30 and 31 of the inner and outer races to provide a drive therebetween when a load is applied to the outer race 12 and the drive shaft 17 is rotated in one direction but, which will not provide such drive connection when the drive shaft 17 is rotated in the other direction. In the former, the typical drive is provided by a cam clutch as illustrated and in the latter, there is the typical overrunning effect as illustrated. A lubricant (not shown) is provided for the bearings 14 and the sprag 13 and is retained by the seals 15 held in position by retaining casings 32 press fitted or otherwise secured to the inner surface 31 of the outer race 12. It should be noted that the seals 15 provide a bearing and sprag lubricant enclosure 33 for the purpose of retaining the lubricant in the area of the bearings 14 and sprag 13.

The first embodiment of the invention is illustrated in FIG. 1 by the cam clutch 10a having an improved venting structure for a lubricant enclosure. In particular, the inner race 11 of the cam clutch 10a (FIG. 1) has a small passage 34 formed therein interconnecting the enclosure chamber 33 with a passage such as the keyway 19 so that the chamber is vented radially inward through the passage 34 and axially outward through the keyway 19 to the atmosphere. The venting structure of the first embodiment of the invention could utilize a single straight or curved passage extending in a radially inward and axially outward direction from the chamber 33 and out through the inner race 11 without particularly relying on the keyway 19 as a part thereof.

In the operation of the first embodiment 10a of the invention illustrated in FIG. 1, the drive shaft 17 may be rotated in one direction to provide driving connection between the inner and outer races 11 and 12 or it may be driven in the other direction without a driving connection in an overrunning effect. In the latter case, the friction in the bearings 14 and other adjacent rotating elements positioned between the inner and outer members will cause the lubricant and the surrounding air in the enclosure 33 to elevate in temperature and expand.

Ordinarily the expansion in the lubricant and air in the chamber 33 will tend to force oil between the inner race surface 25 and the seals 15 or cause rupture of the seals themselves and eventual loss of lubricant. However, the inner race 11 of the first embodiment 10a of invention 10 has the passage 34 formed therein that provides a means by which the expanding air in the enclosure 33 may escape to the keyway passage 19 and then to the atmosphere to relieve the pressure within the enclosure. Similarly, air may be drawn into the enclosure 33 from the atmosphere when the lubricant and air in the enclosure tend to contract due to cooling off of the clutch during less severe use.

It should be noted that the passage 34 is directed radially inward into the keyway 19 so that centrifugal action during the relative rotation of the inner and outer races 11 and 12 cannot cause lubricant to be forced through the passages 34 and 19 inasmuch as the lubricant will be forced radially outward allowing the only air to pass radially inward through the passage 34. Also, inasmuch as the passage 34 is formed in the inner race and extends radially inward and can only vent through the keyway 19 which is not otherwise connected with the chamber 33, lubricant below a certain level in the cam clutch lubricant encolsure 33 will not run out of the enclosure under the force of gravity when the inner race 11 is stopped with the passage 34 in the down position which is opposite to the position shown (FIG. 1).

Thus, the first embodiment of the invention illustrated by the clutch 10a (FIG. 1) is provided with a lubricant enclosure vent by virtue of the novel inner race structure without danger of loss of lubricant, damage to the seals 15 and without complicated, sensitive, and expensive vent apparatus.

The second embodiment of the invention is illustrated in FIG. 2 by the cam clutch 10b having an improved venting structure for the lubricant enclosure 33. In particular, the inner race 11 of the cam clutch 10b (FIG. 2) has a small passage 35 formed therein interconnecting the enclosure chamber 33 with a groove 36 in the surface of the passage 16 in the inner race 11. The groove 36 in turn opens into the keyway 19. It should be noted that although the groove 36 is shown to be annular, it need not be so limited. For example, groove 36 could be curved in a plane diagonal to the axis of the clutch 10b, on a spiral or helical path, or it could follow some other given path.

The operation and result of the invention illustrated in FIG. 2 is very similar to that of the embodiment shown in FIG. 1. However, it should be noted that in the second embodiment the enclosure 33 is vented through passage 35, groove 36 sealed by the shaft 17, and out through the keyway 19. In the second embodiment 10b of the invention, the passage 35 is similarly directed radially inward into the groove 36 so that centrifugal action during the relative rotation of the inner and outer races 11 and 12 cannot cause lubricant to be forced out through the passages 35, 36, and 19 inasmuch as the lubricant will be forced radially outward allowing only air to pass radially inward through the passage 35 in the event of the expansion of the air and lubricant.

Inasmuch as the passage 35 is formed in the inner race and extends radially inward and can only vent through the keyway 19 which is not otherwise connected with the chamber 33, lubricant below a certain level in the cam clutch lubricant enclosure 33 cannot run out of the enclosure by force of gravity when the inner race 11 of clutch 10b is stopped with the passage 35 in the down position which is opposite to the position shown (FIG. 2) or in any other position. Thus, the embodiment of the invention illustrated by the clutch 10b (FIG. 2) is provided with a lubricant enclosure vent by virtue of the novel inner race structure without danger of loss of lubricant, damage to seals 15 and without complicated, sensitive or expensive vent apparatus.

The third embodiment of the invention is illustrated in FIG. 3 by the cam clutch 10c having an improved venting structure for the lubricant enclosure 33. In particular, the inner race 11 of the cam clutch 10c (FIG. 3) has a small passage 40 formed therein interconnecting the enclosure chamber 33 with a groove 41 in the surface of the passage 16 in the inner race 11.

The operation and result of the invention illustrated in FIG. 3 is very similar to the operation of the embodiments of FIGS. 1 and 2. However, it should be noted that in the third embodiment the enclosure 33 is vented through passage 40 and groove 41 sealed by the shaft 17. In the third embodiment 10c of the invention the passage 40 is similarly directed radially inward into the groove 41 so that centrifugal action during the relative rotation of the inner and outer races 11 and 12 cannot cause lubricant to be forced out through the passages 40 and 41 inasmuch as the lubricant will be forced radially outward allowing only air to pass radially inward through the passage 40 in the event of the expansion of the air and lubricant. Inasmuch as the passage 40 is formed in the inner race and extends radially inward and can only vent through the passage 41 which is not otherwise connected with the chamber 33, lubricant below a certain level in the cam clutch lubricant enclosure 33 cannot run out of the enclosure by force of gravity when the inner race 11 of clutch 10c is stopped with the passage 40 in the down position which is opposite to the position shown (FIG. 3) or in any other position. Thus the embodiment of the invention illustrated by the clutch 10c is provided with a lubricant enclosure vent by virtue of the novel inner race structure without danger of loss of lubricant, damage to seals 15 and without complicated, sensitive or expensive vent apparatus.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. A rotational device adapted to be mounted on a keyed shaft comprising a first member having a passage formed therein for receiving the shaft, a second outer member positioned around said first member, bearing means for rotatably supporting said second member on said first member, and seal means extending between said first and second members for enclosing said bearing means between said first and second members, said first member having a single keyway formed therein opening into the shaft passage and extending axially to the end of the first member, said first member having another passage formed therein at one peripheral point thereof opposite the keyway and extending radially inward from the bearing enclosure and around the surface of the shaft receiving passage and opening into the keyway for venting the bearing enclosure to the atmosphere through the first member.

2. A rotational device adapted to be mounted on a keyed shaft comprising a first member having a passage formed therein for receiving the shaft, a second outer member positioned around said first member, bearing means for rotatably supporting said second member on said first member, and seal means extending between said first and second members for enclosing said bearing means between said first and second members, said first member having a single keyway formed therein opening into the shaft receiving passage and extending axially to the end of the first member, said first member having a vent passage formed therein circumferentially spaced from the keyway and extending radially inwardly from the bearing enclosure at one peripheral point thereof and around the surface of the shaft receiving passage to the atmosphere for venting the bearing enclosure to the atmosphere through the first member.

3. A rotational device adapted to be mounted on a keyed shaft comprising a first member having a passage formed therein for receiving the shaft, a second outer member positioned around said first member, bearing means for rotatably supporting said second member on said first member, and seal means extending between said first and second members for enclosing said bearing means between said first and second members, said first member having a single keyway formed therein opening into the passage and extending axially to the end of the first member, said first member having a venting passage formed therein spaced from the keyway at one peripheral point thereof and extending radially inwardly from the bearing enclosure and in the surface of the shaft receiving passage to a point on the axial termination of the passage for venting the bearing enclosure to the atmosphere through the first member.

References Cited by the Examiner

UNITED STATES PATENTS

| | | | |
|---|---|---|---|
| 1,339,762 | 5/1920 | Hunstad | 277—77 |
| 2,217,801 | 10/1940 | Katcher | 308—187 |
| 2,294,105 | 8/1942 | Wallgren | 308—36.1 |
| 2,598,381 | 5/1952 | Hoffman | 308—36.4 X |
| 2,676,856 | 4/1954 | Kohse | 308—187 |
| 2,851,315 | 9/1958 | Zavoda | 308—187.1 |
| 3,033,577 | 5/1962 | Spiess | 277—74 X |
| 3,107,956 | 10/1963 | Bradley | 308—187 |

FOREIGN PATENTS

| | | |
|---|---|---|
| 708,845 | 7/1941 | Germany. |
| 331,342 | 11/1935 | Italy. |

MARTIN P. SCHWADRON, *Primary Examiner.*

DAVID J. WILLIAMOWSKY, *Examiner.*

R. F. HESS, *Assistant Examiner.*